April 13, 1937.    B. E. O'HAGAN    2,076,962
REGULATING DEVICE USING COPPER OXIDE RECTIFIERS Original Filed Oct. 14, 1930

INVENTOR
Bernard E. O'Hagan.
BY
HIS ATTORNEY

Patented Apr. 13, 1937

2,076,962

UNITED STATES PATENT OFFICE 2,076,962

REGULATING DEVICE USING COPPER OXIDE RECTIFIERS

Bernard E. O'Hagan, Swissvale, Pa., assignor to The Union Switch & Signal Company, Swissvale, Pa., a corporation of Pennsylvania Original application March 31, 1933, Serial No. 663,759, which in turn is a division of Serial No. 488,574, October 14, 1930, now Patent No. 1,966,558, dated July 17, 1934. Divided and this application November 19, 1935, Serial No. 50,558

3 Claims. (Cl. 171—229)

My invention relates to regulating devices using copper oxide rectifiers.

One object of my invention is the provision of novel and improved means for regulating the output voltage of a generator.

I will describe two forms of apparatus embodying my invention, and will then point out the novel features thereof in claims.

Figure 1:
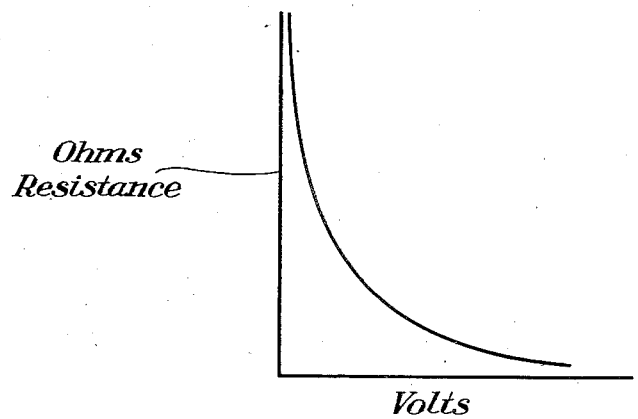
Figure 2:
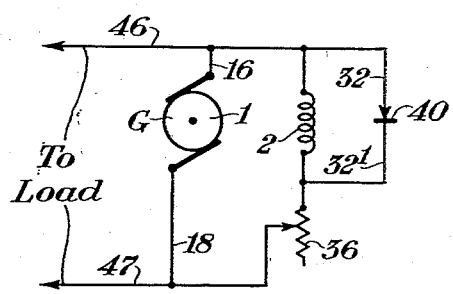
Figure 3:
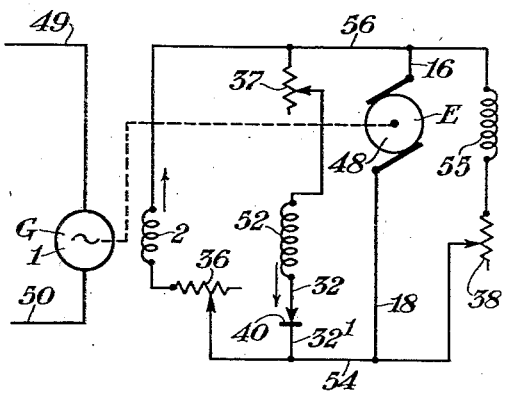

In the accompanying drawing, Fig. 1 is a curve showing certain electrical characteristics of a copper oxide rectifier. Figs. 2 and 3 are views showing two forms of apparatus embodying my invention.

Similar reference characters refer to similar parts in each of the views.

The present application is a division of my application Serial No. 663,759, filed March 31, 1933, for Regulating devices using copper oxide rectifiers, which latter case is a division of my application Serial No. 488,574, filed October 14, 1930, for Regulating devices using copper oxide rectifiers, which has matured into Patent No. 1,966,558, issued July 17, 1934.

Referring first to Fig. 1, the curve shown in this view illustrates the voltage-resistance characteristic of the copper oxide rectifier described and claimed in United States Letters Patent No. 1,640,335, granted to L. O. Grondahl on August 23, 1927. This curve shows that as the voltage across the rectifier increases, the resistance in the low resistance direction decreases, and that the decrease of resistance is much more rapid at low voltages than at high voltages.

Referring to Fig. 2, the reference character G represents a direct current shunt wound generator comprising an armature 1 and a field 2 controlled by a variable resistance 36. Connected in parallel with the shunt field 2, through wires 32 and 32¹, is a rectifier 40 which permits current to flow only in the direction indicated by the arrow. Generator G is loaded across the armature and the load circuit is from wire 16, through wire 46, load, wire 47, and wire 18.

When generator G is driven at a constant speed, the voltage at the terminals of the generator will remain constant, but if the speed of the generator is increased, due to an increase of speed of the driving unit, the terminal voltage will increase. When the voltage of generator G increases, the resistance of the rectifier will decrease, and this decrease of the rectifier resistance causes it to take more current. The increased current taken by the rectifier produces additional voltage drop across a variable resistance 36, thus lowering the voltage across, and, consequently, the current through, field winding 2. This weakening of the field strength counteracts any tendency for the output voltage of the generator to increase due to any cause such as an increase in the speed of the driving unit.

Fig. 3 shows how rectifier 40 may be applied to keep the terminal voltage of an alternating current generator constant when the generator field is energized by current from an exciter driven by the alternating current generator shaft. Generator G comprises an armature 1 and a field 2 which is controlled by variable resistance 36. Connected in parallel with the generator field 2 is a rectifier 40 and a differential field 52 which is controlled by variable resistance 37. The current generated by exciter E flows from wire 16, through wire 56, field 2, variable resistance 36, wire 54, and wire 18, and parallel with the field path through variable resistance 37, differential field 52, wire 32, rectifier 40, and wire 32¹. When the generator speed is increased, due to an increase of speed of the driving unit, the voltage across terminals 49 and 50 is increased and the speed of exciter E is increased, increasing the voltage across armature 48 and across rectifier 40. The resistance of rectifier 40 decreases causing an increase of current through differential field 52 which opposes field 2, and the field intensity of armature 1 is decreased. The voltage across terminals 49 and 50 therefore remains constant. By connecting rectifier 40 directly across field 2, as in Fig. 2, the differential field 52 of Fig. 3 can be eliminated.

The main feature of my invention is that since a copper oxide rectifier has the electrical characteristic of lowering its resistance substantially and instantaneously when the voltage across it is increased by a relatively small amount, the rectifier may be used effectively as a regulating device in the manner described.

One advantage resulting from the use of the copper oxide rectifier in the manner described is that, because of the greater resistance change for a given voltage change obtainable with the rectifier as compared with the resistance change of the usual ballast lamp or negative temperature coefficient resistor, more sensitive and positive voltage regulation may be had. Another advantage is that since the copper oxide rectifier is practically instantaneous in its response to voltage changes, as contrasted with devices in which a resistance change follows upon a temperature change requiring an appreciable time interval, the generator voltage can be maintained within very close limits.

It will be apparent that my invention is not limited to the use of the copper oxide rectifier, as any other suitable resistor having a negative resistance-voltage coefficient and the property of changing its resistance instantaneously with voltage changes will provide the useful result to which my invention is directed.

Although I have herein shown and described only three forms of apparatus embodying my invention, it is understood that various changes and modifications may be made therein within the scope of the appended claims without departing from the spirit and scope of my invention.

Having thus described my invention, what I claim is:

1. In combination, an electric generator comprising an armature and a field winding connected in parallel, and a copper oxide rectifier connected in parallel with said field winding for shunting current from said field winding.

2. In combination, an electric generator comprising an armature and a field winding connected in parallel through a series resistor, and a copper oxide rectifier connected across the terminals of said winding for shunting current from said field winding.

3. In combination, an electric generator comprising an armature and a shunt field, a first resistor connected in series with said field, and a second resistor having a relatively high negative resistance-voltage characteristic as well as the property of instantaneously varying its resistance in accordance with voltage changes, said second resistor being connected in parallel with said field for regulating the voltage of said armature.

BERNARD E. O'HAGAN.